United States Patent
Takahashi et al.

(10) Patent No.: US 11,316,152 B2
(45) Date of Patent: Apr. 26, 2022

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

(71) Applicant: SHIN-ETSU CHEMICAL CO., LTD., Tokyo (JP)

(72) Inventors: Kohta Takahashi, Takasaki (JP); Takakazu Hirose, Annaka (JP); Takumi Matsuno, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 186 days.

(21) Appl. No.: 16/634,357

(22) PCT Filed: Jul. 9, 2018

(86) PCT No.: PCT/JP2018/025802
§ 371 (c)(1),
(2) Date: Jan. 27, 2020

(87) PCT Pub. No.: WO2019/026550
PCT Pub. Date: Feb. 7, 2019

(65) Prior Publication Data
US 2021/0028447 A1 Jan. 28, 2021

(30) Foreign Application Priority Data
Aug. 3, 2017 (JP) .............................. JP2017-150466

(51) Int. Cl.
*H01M 4/36* (2006.01)
*H01M 4/48* (2010.01)
(Continued)

(52) U.S. Cl.
CPC .......... *H01M 4/366* (2013.01); *H01M 4/483* (2013.01); *H01M 4/625* (2013.01);
(Continued)

(58) Field of Classification Search
None
See application file for complete search history.

(56) References Cited

U.S. PATENT DOCUMENTS 5,395,711 A    3/1995  Tahara et al.
7,459,236 B2  12/2008  Konishiike et al.
(Continued)

FOREIGN PATENT DOCUMENTS

EP    3 598 541 A1   1/2020
JP       2997741 B2   1/2000
(Continued)

OTHER PUBLICATIONS

Aug. 11, 2020 Office Action issued in Japanese Patent Application No. 2017-150466.
(Continued)

*Primary Examiner* — Wyatt P McConnell
(74) *Attorney, Agent, or Firm* — Oliff PLC (57) ABSTRACT

A negative electrode active material for a non-aqueous electrolyte secondary battery, containing a negative electrode active material particle, wherein the negative electrode active material particle includes a silicon compound particle containing a silicon compound ($SiO_x$: $0.5 \leq x \leq 1.6$), the silicon compound particle contains a Li compound, at least a part of the silicon compound particle is coated with a carbon material, and an O-component fragment and a CH-component fragment are detected from the negative electrode active material particle in a measurement by TOF-SIMS, and a ratio of a peak intensity A of the O-component fragment to a peak intensity B of the CH-component frag-
(Continued)

ment is 0.5≤A/B≤100. This provides a negative electrode active material for a non-aqueous electrolyte secondary battery capable of increasing battery capacity and improving the cycle characteristics and battery initial efficiency.

12 Claims, 1 Drawing Sheet

(51) Int. Cl.
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2017/0207450 | A1 | 7/2017 | Takahashi et al. |
| 2018/0047981 | A1 | 2/2018 | Ito |
| 2018/0226648 | A1 | 8/2018 | Takahashi et al. |
| 2019/0058189 | A1* | 2/2019 | Matsuno ............... H01M 4/364 |
| 2019/0341602 | A1 | 11/2019 | Matsuno et al. |

FOREIGN PATENT DOCUMENTS

| | | |
|---|---|---|
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2010-092830 A | 4/2010 |
| JP | 2016-192385 A | 11/2016 |
| JP | 2017-004895 A | 1/2017 |
| JP | 2017-059410 A | 3/2017 |
| JP | 2017-092009 A | 5/2017 |
| WO | 2016/009590 A1 | 1/2016 |

OTHER PUBLICATIONS

Sodhi R N S, "Time-Of-Flight Secondary Ion Mass Spectrometry (TOF-SIMS):—Versatility in Chemical and Imaging Surface Analysis", Analyst, London, GB, vol. 129, No. 6, Jun. 1, 2004 (Jun. 1, 2004), pp. 483-487, XP008037957, DOI: 10.1039/B402607C.
Bruno Lanson, "Decomposition of Experimental X-ray Diffraction Patterns (Profile Fitting): A Convenient Way to Study Clay Minerals", Clays and Clay Minerals, vol. 45, No. 2, Jan. 1, 1997 (Jan. 1, 1997), pp. 132-146, XP055207121, ISSN: 0009-8604, DOI: 10.1346/CCMN.1997.0450202.
"A Basic Guide to Particle Characterization", Malvern Instruments Worldwide—White Paper, May 2, 2012 (May 2, 2012), pp. 1-26, XP055089322, <URL:http://golik.co.il/Data/ABasicGuidtoParticleCharacterization(2)_1962085150.pdf>.
Hye Jin Kim et al., "Controlled Prelithiation of Silicon Monoxide for High Performance Lithium-Ion Rechargeable Full Cells", NANO Letters, vol. 16, No. 1, Dec. 22, 2015 (Dec. 22, 2015), pp. 282-288, XP055558866, US ISSN: 1530-6984, D0I: 10.1021/acs.nanolett.5b03776.
Hye Jin Kim et al., "S1 Supporting Information Controlled Prelithiation of Silicon Monoxide for High Performance Lithium-ion Rechargeable Full Cells", Dec. 22, 2015 (Dec. 22, 2015), pp. 282-288, XP055783548, Retrieved from the Internet: <URL:https://pubs.acs.org/doi/abs/10.1021/acs.nanolett.5b03776>.
Mar. 19, 2021 Extended Search Report issued in European Patent Application No. 18841790.1.
Feb. 4, 2020 International Preliminary Report on Patentability issued in International Patent Application No. PCT/JP2018/025802.
Sep. 11, 2018 Search Report issued in International Patent Application No. PCT/JP2018/025802.

* cited by examiner

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

TECHNICAL FIELD

The present invention relates to a negative electrode active material for a non-aqueous electrolyte secondary battery, a non-aqueous electrolyte secondary battery, and a method for producing a negative electrode material for a non-aqueous electrolyte secondary battery.

BACKGROUND ART

In recent years, small electronic devices, represented by mobile devices, have been widely used and urgently required to further reduce the size and weight and to increase the life. Such market requirements have advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a theoretical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials, to an integrated type in which the materials are directly accumulated on a current collector.

Use of silicon as a main material of a negative electrode active material, however, expands and shrinks the negative electrode active material when charging or discharging, thereby making the negative electrode active material easy to break particularly near its surface layer. In addition, this negative electrode active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials and configurations of a negative electrode for a lithium-ion secondary battery mainly using a silicon material have been considered to improve the initial efficiency and the cycle characteristics of the battery.

Specifically, a vapor deposition method is used to deposit silicon and amorphous silicon dioxide simultaneously so that better cycle characteristics and greater safety are achieved (see Patent Document 1, for example). Moreover, a carbon material (an electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \le x \le 1.5$, the range of particle size=1 μm to 50 μm) and a carbon material are mixed and calcined at a high temperature (see Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example). Moreover, to improve the cycle characteristics, a hydrophobic layer such as a silane compound layer is formed on the surface of a silicon material (see Patent Document 9, for example).

Moreover, a silicon oxide is used and a surface thereof is coated with graphite coating to give electric conductivity so that improved cycle characteristics are achieved (see Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle characteristics (see Patent Document 11, for example). Moreover, a silicon oxide controlled to have a silicon-to-oxygen atomicity ratio of 1:y ($0 < y < 2$) is used to improve overcharge and overdischarge characteristics (see Patent Document 12, for example). Moreover, a mixed electrode containing silicon and carbon with a silicon content of 5 wt % or more and 13 wt % or less is produced to achieve higher battery capacity and improved cycle performance (See Patent Document 13, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806

Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741
Patent Document 13: Japanese Unexamined Patent publication (Kokai) No. 2010-092830

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. In addition, the lithium ion secondary battery using a silicon material is desired to have battery characteristics almost equivalent to those of a lithium ion secondary battery using a carbon material.

The present invention has been made in view of the above problems, and it is an object of the present invention to provide a negative electrode active material for a non-aqueous electrolyte secondary battery capable of increasing battery capacity and improving the cycle characteristics and battery initial efficiency. Furthermore, it is also an object of the present invention to provide a method for producing a negative electrode material capable of increasing battery capacity and improving the cycle characteristics and battery initial efficiency.

Solution to Problem

To achieve the above object, the present invention provides a negative electrode active material for a non-aqueous electrolyte secondary battery, containing a negative electrode active material particle, wherein the negative electrode active material particle comprises a silicon compound particle containing a silicon compound ($SiO_x$: $0.5 \leq x \leq 1.6$), the silicon compound particle contains a Li compound, at least a part of the silicon compound particle is coated with a carbon material, and an O-component fragment and a CH-component fragment are detected from the negative electrode active material particle in a measurement by TOF-SIMS, and a ratio of a peak intensity A of the O-component fragment to a peak intensity B of the CH-component fragment is $0.5 \leq A/B \leq 100$.

The inventive negative electrode active material contains a negative electrode active material particle containing a silicon compound, and therefore, has a high battery capacity.

Moreover, in the silicon compound, a $SiO_2$ component part to be destabilized with insertion and extraction of lithium when charging or discharging the battery is previously modified into a Li compound. Thus, irreversible capacity generated at charging can be reduced. Moreover, capacity retention rate and initial efficiency can be improved because of appropriate electric conductivity due to inclusion of a carbon coating. Further, when a surface state is such that an O-component fragment is detected, the negative electrode active material becomes well compatible with a binder, and as a result, capacity retention rate and initial efficiency can be improved. Further, by containing on the surface a compound containing an O component, hydrophilicity of the silicon compound particle is improved, and therefore, the stability of slurry is improved. In a measurement by TOF-SIMS, when the ratio A/B of the peak intensity A of the O component and the peak intensity B of the CH component is 0.5 or more, the above effect is possible. When A/B is 100 or less, it is possible to suppress side reaction at the surface, and the lowering of initial efficiency can be suppressed. Note that, hereinafter, the negative electrode active material particle including the silicon compound particle is also referred to as silicon-based active material particle. In addition, the negative electrode active material including this silicon-based active material particle is also referred to as silicon-based active material.

In this case, preferably, the silicon compound particle at least partially contains at least one or more selected from $Li_4SiO_4$, $Li_2SiO_3$, and $Li_2Si_2O_5$.

Such Li silicates as the above $Li_4SiO_4$, $Li_2SiO_3$, and $Li_2Si_2O_5$ are relatively stable as the Li compound, so that more favorable battery characteristics are obtained.

Further, the negative electrode active material particle preferably has a volume resistivity of 0.01 Ω·cm or more and less than 100 Ω·cm which is measured by a four-point probe method in accordance with JIS K 7194 under a load of 38.2 MPa.

In this way, when the volume resistivity of the silicon-based active material particle is 0.01 Ω·cm or more and less than 100 Ω·cm, sufficient electric conductivity can be guaranteed, so that more favorable battery characteristics are obtained.

Further, preferably, the silicon compound particle has a diffraction peak attributable to a Si(111) crystal face obtained from an X-ray diffraction, a half value width (2θ) of the diffraction peak is 1.2° or more, and a crystallite size corresponding to the crystal face is 7.5 nm or less.

The silicon compound particle having such a crystallite size has low crystallinity, and the content of the Si crystal is low, so that the battery characteristics can be improved.

Further, the silicon compound particle preferably has a median diameter of 0.5 μm or more and 20 μm or less.

When the median diameter is 0.5 μm or more, a side reaction occurs in a smaller area on the surface of the silicon compound particle, so that the battery can keep the cycle retention rate high without excessively consuming Li. Meanwhile, when the median diameter is 20 μm or less, the silicon compound particle expands less during Li insertion and is hard to break and to form a crack. Further, since the expansion of the silicon compound particle is small, for example, a negative electrode active material layer and the like in which a commonly used silicon-based active material is mixed with a carbon active material becomes hard to break.

Further, the present invention provides a non-aqueous electrolyte secondary battery comprising any one of the above negative electrode active materials for a non-aqueous electrolyte secondary battery.

Such a secondary battery has high cycle retention rate and first time efficiency, and can be produced industrially advantageously.

Furthermore, the present invention provides a method for producing a negative electrode material for a non-aqueous electrolyte secondary battery containing a negative electrode active material particle comprising a silicon compound particle, the method comprising the steps of: fabricating a silicon compound particle containing a silicon compound (SiO$_x$: 0.5≤x≤1.6); coating at least a part of the silicon compound particle with a carbon material to obtain a negative electrode active material particle; inserting Li into the silicon compound particle to modify the silicon compound particle; cleaning the negative electrode active material particle comprising the silicon compound particle after modification; and selecting a negative electrode active material particle, wherein an O-component fragment and a CH-component fragment are detected from the negative electrode active material particle after cleaning, in a measurement by TOF-SIMS, and a ratio of a peak intensity A of the O-component fragment to a peak intensity B of the CH-component fragment is 0.5≤A/B≤100, wherein a negative electrode material for a non-aqueous electrolyte secondary battery is produced using the negative electrode active material particle which has been selected.

Such a method for producing a negative electrode material for a non-aqueous electrolyte secondary battery can give a negative electrode material having high battery capacity and favorable cycle retention rate, which reflect the intrinsic features of the silicon oxide modified with Li.

Furthermore, the present invention provides a method for producing a negative electrode material for a non-aqueous electrolyte secondary battery containing a negative electrode active material particle comprising a silicon compound particle, the method comprising the steps of: fabricating a silicon compound particle containing a silicon compound (SiO$_x$: 0.5≤x≤1.6); coating at least a part of the silicon compound particle with a carbon material to obtain a negative electrode active material particle; inserting Li into the silicon compound particle to modify the silicon compound particle; cleaning the negative electrode active material particle comprising the silicon compound particle after modification; fabricating a negative electrode active material particle, wherein by performing on the negative electrode active material particle after cleaning, a surface modification to adjust an intensity of an O-component fragment detected in a measurement by TOF-SIMS, an O-component fragment and a CH-component fragment are detected in a measurement by TOF-SIMS, and a ratio of a peak intensity A of the O-component fragment to a peak intensity B of the CH-component fragment is 0.5≤A/B≤100; and a negative electrode material for a non-aqueous electrolyte secondary battery is produced using the negative electrode active material particle which has been fabricated.

Such a method for producing a negative electrode material for a non-aqueous electrolyte secondary battery can also give a negative electrode material having high battery capacity and favorable cycle retention rate, which reflect the intrinsic features of the silicon oxide modified with Li.

Advantageous Effects of Invention

The inventive negative electrode active material is capable of improving the stability of a slurry fabricated in producing a secondary battery. The use of this slurry makes it possible to form an industrially utilizable coating, thereby substantially improving the battery capacity, cycle characteristics, and first time charge-discharge characteristics. Moreover, the inventive secondary battery containing this negative electrode active material can be produced industrially advantageously, and has favorable battery capacity, cycle characteristics, and first time charge-discharge characteristics. Further, the same effects can be obtained also from an electronic device, a machine tool, an electric vehicle, a power storage system, and so on which use the inventive secondary battery.

In addition, the inventive method for producing a negative electrode material makes it possible to produce a negative electrode material capable of improving the stability of a slurry fabricated in producing a secondary battery, and improving the battery capacity, cycle characteristics, and first time charge-discharge characteristics.

DESCRIPTION OF EMBODIMENTS

Hereinafter, embodiments of the present invention will be described, but the present invention is not limited thereto.

As described above, for increasing the battery capacity of lithium ion secondary batteries, a method using a negative electrode mainly made from a silicon-based active material as a negative electrode for a lithium ion secondary battery has been investigated. Such a lithium ion secondary battery using a silicon-based active material as the main material is desired to have cycle characteristics and initial efficiency almost equivalent to those of a lithium ion secondary battery using a carbon material. However, a negative electrode material showing a cycle stability equivalent to that of a non-aqueous electrolyte secondary battery using a carbon material has not been proposed. Furthermore, since a silicon compound containing oxygen in particular has a low initial efficiency compared to carbon material, an improvement in the battery capacity was limitative for that part.

Accordingly, the present inventors have diligently investigated to obtain a negative electrode active material that can easily produce a non-aqueous electrolyte secondary battery having high battery capacity as well as favorable cycle characteristics and initial efficiency; thereby, arriving at the present invention.

The inventive negative electrode active material for a non-aqueous electrolyte secondary battery contains a negative electrode active material particle. The negative electrode active material particle includes a silicon compound particle containing a silicon compound (SiO$_x$: 0.5≤x≤1.6). Further, the silicon compound particle contains a Li compound. Moreover, at least a part of the silicon compound particle is coated with a carbon material. Further, an O-component fragment and a CH-component fragment are detected from the negative electrode active material particle in a measurement by TOF-SIMS (Time-of-Flight Secondary Ion Mass Spectrometry), and a ratio of a peak intensity A of the O-component fragment to a peak intensity B of the CH-component fragment is $0.5 \leq A/B \leq 100$.

The O component indicates a component in which a mass fragment is detected in a range of $m/z=16\pm0.1$. Moreover, the CH component indicates a component in which a mass fragment is detected in a range of $m/z=13\pm0.1$.

The O component and the CH component on the silicon compound surface can be identified by TOF-SIMS. The O-component and the CH-component fragments on the outermost layer can be measured under the following conditions.

PHI TRIFT 2 made by ULVAC-PHI Inc.
Primary Ion Source: Ga
Sample Temperature: 25° C.
Accelerating Voltage: 5 kV
Spot Size: 100 μm×100 μm
Sputter: Ga, 100 μm×100 μm, 10 s
Negative Ion Mass Spectrum
Sample: pressed with indium metal into a powder form Such a negative electrode active material contains a silicon-based active material particle, and therefore, has a high battery capacity. Moreover, in the silicon compound, a $SiO_2$ component part to be destabilized with insertion and extraction of lithium when charging or discharging the battery is previously modified into a Li compound. Thus, irreversible capacity generated at charging or discharging can be reduced. Further, because of the surface state of having an O-component fragment on the outermost surface, the binding with the binder is improved, and as a result, battery characteristics such as initial characteristics and cycle characteristics are improved. Moreover, by containing on the surface a compound containing an O component, hydrophilicity of the silicon compound particle is improved, and therefore, the stability of slurry is improved. In a measurement by TOF-SIMS, when the ratio of the peak intensity A of the O component and the peak intensity B of the CH component is 0.5 or more, the above binding effect is possible. When the ratio is 100 or less, it is possible to suppress side reaction at the surface, and the lowering of initial efficiency can be suppressed.

[Configuration of Negative Electrode]

Next, description will be given of a configuration of a negative electrode of a secondary battery containing the inventive negative electrode active material for a non-aqueous electrolyte secondary battery as described above.

Figure 1:
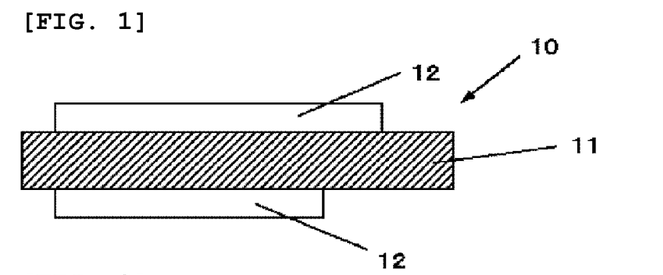
FIG. 1 is a sectional view showing a configuration of a negative electrode containing the inventive negative electrode active material.

FIG. 1 shows a sectional view of a negative electrode containing the inventive negative electrode active material. As shown in FIG. 1, a negative electrode 10 is constituted to have a negative electrode active material layer 12 on a negative electrode current collector 11. This negative electrode active material layer 12 may be disposed on both sides or only one side of the negative electrode current collector 11. Further, in the inventive negative electrode of a non-aqueous electrolyte secondary battery, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and/or sulfur (S) besides the main element because these elements improve the physical strength of the negative electrode current collector. In particular, when an active material layer that expands in charging is contained, the current collector containing the above elements has an effect of suppressing deformation of an electrode including the current collector. Each content of the contained elements is not particularly limited, but is preferably 100 ppm or less each. This is because a high effect of suppressing deformation is obtained.

The surface of the negative electrode current collector 11 may or may not be roughened. Examples of the roughened negative electrode current collector include a metallic foil subjected to an electrolyzing process, an embossing process, a chemical etching process, and the like. Examples of the negative electrode current collector that is not roughened include a rolled metallic foil and the like.

[Negative Electrode Active Material Layer]

The negative electrode active material layer 12 may contain multiple types of negative electrode active materials such as a carbon-based active material in addition to the silicon-based active material particle. The negative electrode active material layer 12 may further contain other materials such as a thickener (also referred to as "binding agent", "binder") or a conductive assistant agent depending on battery design. The form of the negative electrode active material may be particle.

As described above, the inventive negative electrode active material contains a silicon compound particle, and the silicon compound particle is a silicon oxide material containing a silicon compound ($SiO_x$: $0.5 \leq x \leq 1.6$). In this composition, "x" is preferably close to 1. This is because high cycle characteristics are obtained. Note that the composition of the silicon oxide material in the present invention does not necessarily mean purity of 100%, and may contain a small quantity of impurity elements or Li.

In the present invention, the silicon compound becomes more favorable as the crystallinity is lower. Specifically, it is desirable that the silicon compound particle has a diffraction peak attributable to a Si(111) crystal face obtained from an X-ray diffraction, a half value width (2θ) of the diffraction peak is 1.2° or more, and a crystallite size corresponding to the crystal face is 7.5 nm or less. This crystallite size may be calculated from a half value width of a diffraction peak attributable to a Si(111) crystal face obtained from an X-ray diffraction. In particular, when the crystallinity and the content of the Si crystal are low as described above, this not only improves the battery characteristics but also can form a stable Li compound.

Measurement of the X-ray diffraction can be performed with an X-ray diffraction with copper as an anticathode (Cu-Kα). In this case, a diffraction peak with a region near 2θ=28.4° as the center assigned to Si(111) is observed, and preferably, the spread of the diffraction line is 1.2° or more as described above, and the crystallite size of the silicon crystal determined by Scherrer's equation on the basis of the spread of the diffraction line is 7.5 nm or less as described above.

Moreover, the silicon compound particle particularly preferably has a median diameter of 0.5 μm or more and 20 μm or less without particular limitation thereto. This range makes it easy to occlude and release lithium ions in charging and discharging, and the silicon-based active material particle becomes less liable to break. When the median diameter is 0.5 μm or more, the surface area is not so large that a side reaction is less liable to occur in charging and discharging, and the irreversible battery capacity can be decreased. Meanwhile, the median diameter is preferably 20

µm or less because the silicon-based active material particle becomes less liable to break, thereby being prevented from forming a new surface.

Further, in the inventive silicon-based active material, at least one or more selected from $Li_4SiO_4$, $Li_2SiO_3$, and $Li_2Si_2O_5$ are preferably present as the Li compound contained in at least a part of the silicon compound particle. Such Li silicates as $Li_4SiO_4$, $Li_2SiO_3$, and $Li_2Si_2O_5$ are more stable than other Li compounds. Accordingly, the silicon-based active material containing the Li compound(s) enables more stable battery characteristics. These Li compounds can be obtained by selectively changing a part of $SiO_2$ component formed in the silicon compound particle to a Li compound to modify the silicon compound particle.

The Li compound in the silicon compound particle can be quantified by NMR (Nuclear Magnetic Resonance) and XPS (X-ray Photoelectron Spectroscopy). The XPS and NMR measurements can be performed, for example, under the following conditions.

XPS
Apparatus: an X-ray photoelectron spectrometer,
X-ray Source: a monochromatic Al Kα line,
X-ray Spot Diameter: 100 µm,
Ar-ion Gun Sputtering Conditions: 0.5 kV, 2 mm×2 mm.
$^{29}$Si MAS NMR (magic angle spinning-Nuclear Magnetic Resonance)
Apparatus: a 700-NMR spectroscope made by Bruker Corp.,
Probe: a 4-mm HR-MAS rotor, 50 µL,
Sample Rotation Speed: 10 kHz,
Measurement Environment Temperature: 25° C.

Furthermore, in the present invention, when the silicon compound particle is to be modified, it is possible to employ methods such as an electrochemical method, modification by oxidation-reduction reactions, and thermal doping, which is a physical method. Particularly, the negative electrode active material is improved in relation to battery characteristics when the silicon compound particle is modified by employing an electrochemical method and modification by oxidation-reduction. Moreover, the modification is preferably performed by not only inserting Li into the silicon compound particle but also stabilizing the Li compound by heating and/or releasing Li from the silicon compound particle. Thereby, the stability, including the water resistance, of the negative electrode active material in a slurry is further improved.

Additionally, in the inventive negative electrode active material, the silicon compound particle preferably has a peak attributable to a $SiO_2$ region given in a chemical shift value of −95 to −150 ppm obtained from a $^{29}$Si-MAS-NMR spectrum. With such modification that the $SiO_2$ region remains to some extent without changing the entire $SiO_2$ region of the silicon compound particle into a Li compound, the stability in a slurry is further improved.

Moreover, as described above, in the present invention, since at least a part of the silicon compound particle is coated with a carbon material, an appropriate electric conductivity can be obtained.

Moreover, in the inventive negative electrode active material, a coating amount of the carbon material is preferably 0.5 mass % or more and 15 mass % or less relative to a total of the silicon compound particle and the carbon material. With such a coating amount of the carbon material, the negative electrode active material particle has high capacity and excellent electric conductivity.

Further, in the inventive negative electrode active material, the negative electrode active material particle preferably has a volume resistivity of 0.01 Ω·cm or more and less than 100 Ω·cm which is measured by a four-point probe method in accordance with JIS K 7194 under a load of 38.2 MPa. With the volume resistivity of 0.01 Ω·cm or more and less than 100 Ω·cm, sufficient electric conductivity can be guaranteed, so that more favorable battery characteristics are obtained.

[Method of Producing Negative Electrode]

Subsequently, description will be given of an example of a method for producing the inventive negative electrode of a non-aqueous electrolyte secondary battery.

First, a method for producing a negative electrode material to be contained in the negative electrode will be described. In the beginning, a silicon compound particle containing a silicon compound ($SiO_x$: $0.5 \leq x \leq 1.6$) is fabricated. Next, at least a part of the silicon compound particle is coated with a carbon material to obtain a negative electrode active material particle. Next, Li is inserted into the silicon compound particle to modify silicon compound particle. In this event, a Li compound can be formed in the interior and on the surface of the silicon compound particle simultaneously. Moreover, in this event, among the inserted Li atoms, some Li atoms may be released from the silicon compound particle.

Next, the negative electrode active material particle including the silicon compound particle after modification is cleaned. Next, a negative electrode active material particle is selected, in which an O-component fragment and a CH-component fragment are detected from the negative electrode active material particle after cleaning, in a measurement by TOF-SIMS, and a ratio of a peak intensity A of the O-component fragment to a peak intensity B of the CH-component fragment is $0.5 \leq A/B \leq 100$. Using such a negative electrode active material particle (silicon-based negative electrode active material particle) and, for example, mixing with a conductive assistant agent and/or a binder, a negative electrode material and a negative electrode can be produced.

Furthermore, when cleaning the negative electrode active material particle including the silicon compound particle after modification as described above, it is also possible to make an adjustment so as to satisfy the above condition $0.5 \leq A/B \leq 100$. That is, it is also possible to fabricate a negative electrode active material particle, in which, by performing on the negative electrode active material particle after cleaning, a surface modification to adjust an intensity of an O-component fragment detected in a measurement by TOF-SIMS, an O-component fragment and a CH-component fragment are detected in a measurement by TOF-SIMS, and a ratio of a peak intensity A of the O-component fragment to a peak intensity B of the CH-component fragment is $0.5 \leq A/B \leq 100$. In particular, it is easier to obtain a surface state of having an O-component fragment on the surface in a TOF-SIMS measurement when the negative electrode active material particle after modification is cleaned with an alcohol, alkaline water (aqueous alkaline solution) with lithium carbonate, lithium oxide or lithium hydroxide dissolved, weak acid or pure water or the like. Using such a negative electrode active material particle (silicon-based negative electrode active material particle) and, for example, mixing with a conductive assistant agent and/or a binder, a negative electrode material and a negative electrode can be produced.

More specifically, the negative electrode material is produced, for example, by the following procedure.

First, a raw material which generates silicon oxide gas is heated in the presence of inert gas or under reduced pressure in a temperature range of 900° C. to 1600° C. to generate silicon oxide gas. In this case, the raw material is a mixture of metallic silicon powder and silicon dioxide powder. In consideration of the existence of oxygen on the surface of the metallic silicon powder and slight oxygen in a reaction furnace, the mixing mole ratio is desirably in a range of 0.8<metallic silicon powder/silicon dioxide powder<1.3. The Si crystallite in the particle is controlled by changing the arrangement range and the evaporation temperature or a heat treatment after the preparation. The generated gas is deposited on an adsorption plate. Subsequently, the deposit is taken out under the condition of the temperature in the reaction furnace being lowered to 100° C. or below, and then the deposit is ground and powdered using a ball mil, a jet mil, or the like.

Next, a carbon coating (carbon material) is formed on a surface layer of the obtained powder material (silicon compound particle). The carbon coating is effective to further improve the battery characteristics of the negative electrode active material.

As a method for forming the carbon coating on the surface layer of the powder material, thermal decomposition CVD is desirable. In the thermal decomposition CVD, the silicon oxide powder is set in a furnace, the furnace is filled with a hydrocarbon gas, and the temperature in the furnace is raised. The pyrolysis temperature is particularly preferably, but not particularly limited to, 1200° C. or less, more preferably 950° C. or less because unintentional disproportionation of the silicon oxide can be suppressed. The hydrocarbon gas is not particularly limited, but preferably has a composition of $C_nH_m$ where $3 \geq n$. This is because of low production cost and favorable properties of the decomposition products.

Next, Li is inserted into the negative electrode active material particle including a silicon active material particle fabricated as described above. In this event, at least one or more out of $Li_4SiO_4$, $Li_2SiO_3$, and $Li_2Si_2O_5$ are preferably contained. The insertion of Li is preferably performed by an electrochemical method or an oxidation-reduction method.

The electrochemical method is performed desirably using an apparatus capable of electrochemically inserting and releasing Li. Although the apparatus structure is not particularly limited, the bulk modification can be performed using a bulk modification apparatus 20 shown in FIG. 2, for example. The bulk modification apparatus 20 has: a bath 27 filled with an organic solvent 23; a positive electrode (lithium source, modification source) 21 disposed in the bath 27 and connected to one terminal of a power source 26; a powder storage container 25 disposed in the bath 27 and connected to the other terminal of the power source 26; and a separator 24 provided between the positive electrode 21 and the powder storage container 25. A silicon oxide particle (silicon-based active material particle) 22 is stored in the powder storage container 25. As described above, the powder storage container stores the silicon oxide particle, and the power source applies voltage between the powder storage container storing the silicon oxide particle and the positive electrode (lithium source). Thereby, lithium can be inserted into or released from the silicon compound particle so that the silicon oxide particle 22 can be modified. Heating the resulting silicon oxide particle at 400 to 800° C. can stabilize the Li compound. After the modification, cleaning may be performed with alcohol, alkaline water, weak acid, pure water, or the like.

Figure 2:
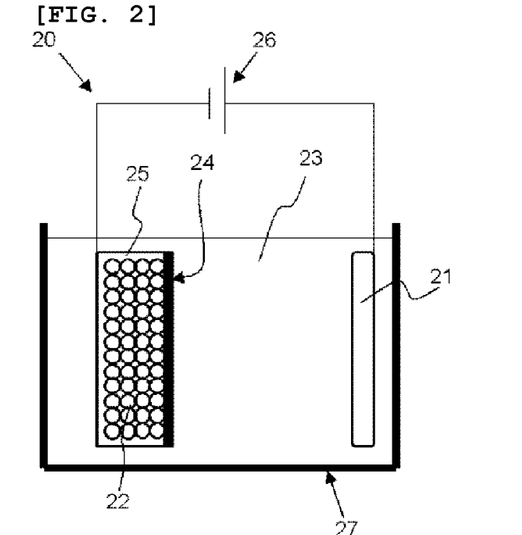
FIG. 2 is a schematic diagram showing an example of a bulk modification apparatus usable in producing the inventive negative electrode active material.

As the organic solvent 23 in the bath 27, it is possible to use ethylene carbonate, propylene carbonate, dimethyl carbonate, diethyl carbonate, ethylmethyl carbonate, fluoromethylmethyl carbonate, difluoromethylmethyl carbonate, or the like. Moreover, as an electrolyte salt contained in the organic solvent 23, it is possible to use lithium hexafluorophosphate ($LiPF_6$), lithium tetrafluoroborate ($LiBF_4$), or the like.

As the positive electrode 21, a Li foil or a Li-containing compound may be used. Examples of the Li-containing compound include lithium carbonate, lithium oxide, lithium cobalt oxide, olivine iron lithium, lithium nickel oxide, and lithium vanadium phosphate.

After the electrochemical Li doping modification, cleaning can be performed by, for example, a method of cleaning with an alkaline water with lithium carbonate, lithium oxide or lithium hydroxide dissolved, alcohol, weak acid or pure water or the like, thereby obtaining a surface state of having an O-component fragment on the surface in a TOF-SIMS measurement. It is unclear specifically what compounds contribute to such a surface state, but presumably, by cleaning with water or the like, a compound containing Li and O (LiOH, $Li_2O$, Li salts such as $Li_2CO_3$, Li silicates such as $Li_2Si_2O_5$, $Li_2SiO_3$, $Li_4SiO_4$) is formed or an OH group is formed on a Si surface, a $SiO_2$ surface, or a carbon coating surface.

In the modification by the oxidation-reduction method, for example, first, lithium is dissolved in an ether-based solvent to prepare a solution A. The silicon-based active material particle is immersed in the solution A, so that lithium can be inserted. The solution A may further contain a polycyclic aromatic compound or a linear polyphenylene compound. By heating the resulting silicon-based active material particle at 400 to 800° C., the Li compound can be stabilized. Moreover, after the lithium insertion, the silicon-based active material particle may be immersed in a solution B containing a polycyclic aromatic compound or a derivative thereof to release active lithium from the silicon-based active material particle. As a solvent of the solution B, for example, an ether-based solvent, a ketone-based solvent, an ester-based solvent, an alcohol-based solvent, an amine-based solvent, or a mixed solvent thereof can be used. Subsequently, cleaning can be performed by, for example, a method of cleaning with an alkaline water with lithium carbonate, lithium oxide or lithium hydroxide dissolved, alcohol, weak acid or pure water or the like, thereby obtaining a surface state of having an O-component fragment on the surface in a TOF-SIMS measurement.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like. Among these, tetrahydrofuran, dioxane, 1,2-dimethoxy ethane, and diethylene glycol dimethyl ether are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, naphthacene, pentacene, pyrene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, naphthacene, pentacene, pyrene, triphenylene, coronene, chrysene, and derivatives thereof.

Moreover, as the ether-based solvent of the solution B, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like.

As the ketone-based solvent, acetone, acetophenone, or the like may be used.

As the ester-based solvent, methyl formate, methyl acetate, ethyl acetate, propyl acetate, isopropyl acetate, or the like may be used.

As the alcohol-based solvent, methanol, ethanol, propanol, isopropyl alcohol, or the like may be used.

As the amine-based solvent, methyl amine, ethyl amine, ethylene diamine, or the like may be used.

Moreover, Li can be inserted into the negative electrode active material particle by thermal doping method. In this case, the negative electrode active material particle (silicon-based active material particle) can be modified, for example, through mixing with LiH powder or Li powder and heating under a non-oxidative atmosphere.

As the non-oxidative atmosphere, for example, Ar atmosphere or the like may be used. More specifically, first, under an Ar atmosphere, the silicon oxide powder is sufficiently mixed with LiH powder or Li powder, and sealed. The whole sealed vessel is agitated to make the mixture uniform. Then, the mixture is heated in a range of 700° C. to 750° C. for the modification. In this case, in order to release Li from the silicon compound particle, cleaning is performed by, for example, a method in which the heated powder is sufficiently cooled, and then cleaning is performed with an alkaline water with lithium carbonate, lithium oxide or lithium hydroxide dissolved, alcohol, weak acid or pure water or the like. Moreover, by this cleaning, a surface state of having an O-component fragment on the surface in a TOF-SIMS measurement is obtained.

Subsequently, a surface modification of the particle surface can be performed on the negative electrode active material particle after modification to adjust an intensity of the O-component fragment on the particle surface detected in a measurement of the negative electrode active material particle by TOF-SIMS. As a method of surface modification, when making the A/B ratio small, examples include making the cleaning time with alcohol, alkaline water, weak acid, or pure water or the like longer. Thus, the dissolved amount of Li salt is increased and the O-component fragment in the TOF-SIMS measurement can be reduced. When making the A/B ratio large, examples include heating under a $CO_2$ atmosphere. Thus, presumably, LiOH and $Li_2O$ become $Li_2CO_3$, and the O-component fragment is increased. If the intensity of the O-component fragment measured by TOF-SIMS is too weak compared to the CH intensity, the binding with the binder is lowered, and as a result, battery characteristics are degraded. If the intensity of the O-component fragment is too strong, Li is trapped by the O component, which leads to reduction of initial efficiency.

Subsequently, the silicon-based active material containing the silicon compound particle having the above-described layer is mixed as necessary with a carbon-based active material. These negative electrode active materials are mixed with other materials such as a binder and a conductive assistant agent to form a negative-electrode mixture. Then, organic solvent, water, or the like is added thereto to form a slurry.

Next, as shown in FIG. 1, the slurry of this negative-electrode mixture is applied onto the surfaces of the negative electrode current collector 11 and dried to form the negative electrode active material layers 12. In this event, heat pressing and so on may be performed as necessary. As described above, the inventive negative electrode of a non-aqueous electrolyte secondary battery can be produced.

<Lithium Ion Secondary Battery>

Next, a non-aqueous electrolyte secondary battery of the present invention will be described. The inventive non-aqueous electrolyte secondary battery contains the inventive negative electrode active material. Here, a lithium-ion secondary battery of a laminate film type will be described as a specific example of the inventive non-aqueous electrolyte secondary battery.

[Configuration of Laminate Film Type Secondary Battery]

Figure 3:
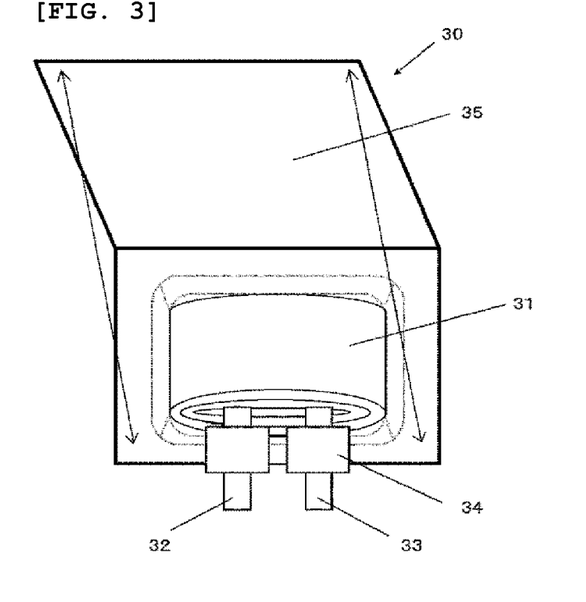
FIG. 3 is an exploded diagram showing an example of configuration (laminate film type) of a lithium-ion secondary battery containing the inventive negative electrode active material.

A laminate film type lithium-ion secondary battery 30 shown in FIG. 3 mainly includes a wound electrode body 31 stored in sheet-shaped outer parts 35. This wound electrode body 31 is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead 32 and the negative-electrode lead 33, for example, extend from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edges of their fusion-bond layers such that each fusion-bond layer faces the wound electrode body 31. The fusion-bond layer is, for example, a film such as a polyethylene or polypropylene film; the metallic layer is aluminum foil or the like; the protecting layer is nylon or the like, for example.

The space between the outer parts 35 and the positive- and negative-electrode leads is filled with close adhesion films 34 to prevent air from entering therein. Exemplary materials of the close adhesion films include polyethylene, polypropylene, and polyolefin resins.

The positive electrode has a positive electrode active material layer disposed on one side or both sides of a positive electrode current collector like the negative electrode 10 shown in FIG. 1, for example.

The positive electrode current collector is made of, for example, a conductive material such as aluminum.

The positive electrode active material layer contains any one kind or two kinds or more of positive electrode materials capable of occluding and releasing lithium ions, and may contain a positive electrode binder, a positive electrode conductive assistant agent, a dispersing agent, or other materials according to design. The same detailed description as described for the negative electrode binders and negative electrode conductive assistant agent, for example, is then given for the positive electrode binder and the positive electrode conductive assistant agent in this case.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and "x" and "y" each represent a value varied depending on a charging or discharging status of a battery, which typically satisfy $0.05 \le x \le 1.10$ and $0.05 \le y \le 1.10$.

Examples of the complex oxide having lithium and a transition metal element include a lithium-cobalt complex oxide ($Li_xCoO_2$), a lithium-nickel complex oxide ($Li_xNiO_2$), a lithium-nickel-cobalt complex oxide, and the like. Examples of the lithium-nickel-cobalt complex oxide include lithium-nickel-cobalt-aluminum complex oxide (NCA), lithium-nickel-cobalt-manganese complex oxide (NCM), and the like.

Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)), and the like. Higher battery capacity and excellent cycle characteristics are obtained using the positive electrode materials described above.

[Negative Electrode]

The negative electrode has a configuration which is similar to that of the above negative electrode 10 for a lithium-ion secondary battery shown in FIG. 1, and, for example, has the negative electrode active material layers disposed on both faces of the current collector. The negative electrode preferably has a negative-electrode charge capacity larger than electrical capacitance (a battery charge capacity) provided by the positive electrode active material. This negative electrode itself can suppress the precipitation of lithium metal thereon.

The positive electrode active material layer is formed partially on both faces of the positive electrode current collector. Similarly, the negative electrode active material layer is also formed partially on both faces of the negative electrode current collector. In this case, the negative electrode active material layer provided on the negative electrode current collector, for example, has a region which does not correspond to a positive electrode active material layer to be faced. This intends to perform a stabilized battery design.

The area at which the positive and negative electrode active material layers do not face one another is hardly affected by charging and discharging. The status of the negative electrode active material layer is consequently retained since its formation. This enables repeatable investigation of, for example, the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films to give laminate structure. Examples of the synthetic resin include polytetrafluoroethylene, polypropylene, polyethylene, and the like.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

As the solvent, for example, a non-aqueous solvent may be used. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, tetrahydrofuran, and the like. Among these, at least one or more out of ethylene carbonate, propylene carbonate, dimethyl carbonate, diethyl carbonate, and ethylmethyl carbonate are preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

The solvent preferably contains an unsaturated carbon bond cyclic carbonate ester as an additive, for this enables the formation of a stable coating on a negative electrode surface at charging and discharging and the inhibition of a decomposition reaction of the electrolytic solution. Examples of the unsaturated carbon bond cyclic carbonate ester include vinylene carbonate, vinyl ethylene carbonate, and the like.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. An example of the acid anhydride includes propane disulfonic acid anhydride.

The electrolyte salt may contain, for example, at least one light metal salt such as lithium salt. Examples of the lithium salt include lithium hexafluorophosphate ($LiPF_6$), lithium tetrafluoroborate ($LiBF_4$), and the like.

The content of the electrolyte salt in the solvent is preferably 0.5 mol/kg or more and 2.5 mol/kg or less. This content enables high ionic conductivity.

[Method of Producing Laminate Film Type Secondary Battery]

Firstly, a positive electrode is produced with the above positive electrode material. A positive-electrode mixture is first created by mixing the positive electrode active material with as necessary the positive electrode binder, the positive electrode conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the compression may be repeated multiple times.

Secondly, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 1).

Then, an electrolytic solution is prepared. Subsequently, with ultrasonic welding or the like, the positive-electrode lead 32 is attached to the positive electrode current collector and the negative-electrode lead 33 is attached to the negative electrode current collector. Then, the positive and negative electrodes and the separator interposed therebetween are stacked or wound to produce the wound electrode body 31 and a protecting tape is stuck to the outermost circumference of the body. Next, the wound body is flattened. Subsequently, the film-shaped outer part 35 is folded in half to interpose the wound electrode body therebetween. The insulating portions of the outer parts are stuck to one another by heat sealing such that the wound electrode body is encapsulated with one direction being opened. Subsequently, the close-adhesion films are inserted between the outer parts and the positive- and negative-electrode leads. Then, the prepared electrolytic solution is introduced from the opened side in a prescribed amount to perform the impregnation of the electrolytic solution under a vacuum. After the impregnation, the opened side is stuck by vacuum heat sealing. In this manner, the laminate film type secondary battery 30 can be produced.

The inventive non-aqueous electrolyte secondary battery such as the laminate film type secondary battery 30 produced as described above preferably has a negative-electrode utilization ratio of 93% or more and 99% or less at charging and discharging. With the negative-electrode utilization ratio in a range of 93% or more, the first time charge efficiency is not lowered, and the battery capacity can be greatly improved. Meanwhile, with the negative-electrode utilization ratio in a range of 99% or less, Li is not precipitated, and the safety can be guaranteed.

EXAMPLE

Hereinafter, the present invention will be more specifically described with reference to Examples of the present invention and Comparative Examples. However, the present invention is not limited to these Examples.

Example 1-1

The laminate film type secondary battery 30 shown in FIG. 3 was produced by the following procedure.

The procedure began with the production of a positive electrode. A positive-electrode mixture was prepared by mixing 95 parts by mass of lithium-nickel-cobalt-aluminum complex oxide ($LiNi_{0.7}Co_{0.25}Al_{0.05}O$) as a positive electrode active material, 2.5 parts by mass of a positive electrode conductive assistant agent (acetylene black), and 2.5 parts by mass of a positive electrode binder (polyvinylidene fluoride: PVDF). Then, the positive-electrode mixture was dispersed in an organic solvent (N-methyl-2-pyrrolidone, NMP) to form a paste slurry. The slurry was subsequently applied to both surfaces of a positive electrode current collector with a coating apparatus having a die head and dried with a drying apparatus of hot-air type. The positive electrode current collector used here had a thickness of 15 μm. The resultant was finally compressed with a roll press.

Next, a negative electrode was produced. In the beginning, a silicon-based active material was produced as follows. A mixed raw material of metallic silicon and silicon dioxide (material to be vaporized) was placed in a reaction furnace and evaporated in an atmosphere with a vacuum degree of 10 Pa to deposit the evaporated material on an adsorption plate. The deposit was sufficiently cooled and then taken out to pulverize the deposit with a ball mill. After the particle size adjustment, the resultant was coated with a carbon coating by thermal CVD.

Subsequently, lithium doping by an oxidation-reduction method was performed on the silicon compound particles coated with the carbon coating as follows, and lithium was inserted into the silicon compound particles for modification. First, the negative electrode active material particles were immersed in a solution (the solution A) in which a lithium piece and an aromatic compound, naphthalene, were dissolved in tetrahydrofuran (hereinafter, referred to as THF). This solution A had been prepared by dissolving naphthalene in a THF solvent at a concentration of 0.2 mol/L, and then adding a lithium piece whose mass was 10 mass % of the mixture solution of THF and naphthalene. When the negative electrode active material particles were immersed in the solution A, the temperature of the solution was 20° C., and the immersion time was 20 hours. Then, the negative electrode active material particles were collected by filtration. By the treatment described above, lithium was inserted into the negative electrode active material particles.

The obtained negative electrode active material particles were heated under an argon atmosphere at 600° C. for 24 hours. Thus, the Li compound was stabilized.

Next, the negative electrode active material particles were cleaned. The cleaned negative electrode active material particles were dried under reduced pressure. The cleaning was performed by agitating in an aqueous alkaline solution for 2 hours. Modification of the negative electrode active material particles was thus performed. By the treatment described above, the negative electrode active material particles were fabricated.

A surface analysis of the obtained negative electrode active material particles was performed by TOF-SIMS. In this event, the measurement conditions were that the analysis was performed using the above-described PHI TRIFT 2 made by ULVAC-PHI Inc. under the above-described conditions.

The silicon-based active material fabricated as described above and a carbon-based active material were blended in a mass ratio of 1:9 to fabricate a negative electrode active material. The carbon-based active material used here was a mixture in which artificial graphite and natural graphite coated with a pitch layer were mixed in a mass ratio of 5:5. Additionally, the carbon-based active material had a median diameter of 20 μm.

Next, the fabricated negative electrode active material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. The resultant was then diluted with pure water to form a negative-electrode mixture slurry. It is to be noted that the foregoing SBR and CMC are negative electrode binders (negative electrode binding agents).

As a negative electrode current collector, an electrolytic copper foil (thickness: 15 μm) was used. Finally, the negative-electrode mixture slurry was applied onto the negative electrode current collector, and dried at 100° C. for 1 hour in a vacuum atmosphere. The dried negative electrode had a deposited amount of the negative electrode active material layer per unit area at one side (also referred to as an area density) of 5 mg/cm$^2$.

Next, fluoroethylene carbonate (FEC), ethylene carbonate (EC), and diethyl carbonate (DEC) were mixed as solvents, followed by dissolving electrolyte salt (lithium hexafluorophosphate: $LiPF_6$) to prepare an electrolytic solution. In this case, the solvent composition was set to FEC:EC:DEC=1:

2:7 in a volume ratio, and the content of the electrolyte salt was set to 1.0 mol/kg based on the solvents. Further, vinylene carbonate (VC) was added in an amount of 1.5 mass % to the obtained electrolytic solution.

Then, a secondary battery was assembled as follows. First, an aluminum lead was attached to one end of the positive electrode current collector with ultrasonic welding, and a nickel lead was welded to the negative electrode current collector. Subsequently, the positive electrode, a separator, the negative electrode, and a separator were laminated in this order, and wound in the longitudinal direction to produce a wound electrode body. The end of the winding portion was fixed with a PET protecting tape. The separator used herein was a 12-μm laminate film in which a film mainly composed of porous polyethylene was sandwiched by films mainly composed of porous polypropylene. Thereafter, the electrode body was put between outer parts, then peripheries excluding one side were hot melted, and the electrode body was stored in the outer parts. As each outer part, an aluminum laminate film was used in which a nylon film, an aluminum foil, and a polypropylene film were laminated. Then, the prepared electrolytic solution was introduced from the open side to perform the impregnation in a vacuum atmosphere. The open side was then stuck by heat sealing.

The cycle characteristics and first time charge-discharge characteristics of the secondary battery produced as described above were evaluated.

The cycle characteristics were investigated in the following manner. First, two cycles of charging and discharging were performed at 0.2 C under an atmosphere of 25° C. to stabilize the battery, and the discharge capacity in the second cycle was measured. Next, the cycle of charging and discharging was repeated until the total number of cycles reached 299 cycles while the discharge capacity was measured every cycle. Finally, a capacity retention rate (hereinafter, also simply referred to as retention rate) was calculated by dividing the discharge capacity in the 300-th cycle, which was obtained by charging and discharging at 0.2 C, by the discharge capacity in the second cycle. In the normal cycle, that is, in the cycles from the third cycle to 299-th cycle, the charging and discharging were performed at 0.7 C in charging and 0.5 C in discharging.

In investigating the first time charge-discharge characteristics, the initial efficiency (also referred to as initial efficiency) was calculated. The initial efficiency was calculated from the equation shown by: initial efficiency (%)=(first time discharge capacity/first time charge capacity)×100. The atmosphere and the temperature were the same as that in investigating the cycle characteristics.

Comparative Example 1-1

A negative electrode active material, a negative electrode material, and a secondary battery were fabricated and the evaluation of the negative electrode active material, the evaluation of the cycle characteristics of the secondary battery and the other evaluations were performed by the same procedures as in Example 1-1 except that the Li doping and the cleaning after the Li doping were not performed.

The TOF-SIMS measurement results of Example 1-1 and Comparative Example 1-1 and the evaluation result of the battery characteristics are shown in Table 1.

In this event, the negative electrode active material particles (silicon-based active material particles) in Example 1-1 and Comparative Example 1-1 had the following properties. The negative electrode active material particles (silicon-based active material particles) had a median diameter of 5 μm. Moreover, the coating amount of the carbon material coated on the surface (mass ratio of the carbon material to the whole particle) was 5 mass %.

Moreover, $Li_2Si_2O_5$ was contained in the silicon compound particles of Example 1-1. Moreover, the silicon compound had a diffraction peak attributable to a Si(111) crystal face obtained from an X-ray diffraction, a half value width (2θ) of the diffraction peak was 1.85°, and a crystallite size attributable to the Si(111) crystal face was 4.6 nm. Moreover, the volume resistivity (under a load of 38.2 MPa) was measured by a four-point probe method in accordance with JIS K 7194, and was 0.3 Ωcm.

TABLE 1

| | | SiO$x$: $x$ = 1.0, $D_{50}$ = 5 μm, coating amount of carbon: 5 mass % | | | | |
|---|---|---|---|---|---|---|
| | Li doping | O component ion intensity A | CH component ion intensity B | A/B | Initial efficiency % | Capacity retention rate % |
| Comparative Example 1-1 | No | 10226 | 38139 | 0.3 | 84.3% | 78% |
| Example 1-1 | Yes | 87054 | 18079 | 4.8 | 89.5% | 82% |

As can be seen from Table 1, in the case with Li doping (Example 1-1), the ratio of the O component ion intensity A to the CH component ion intensity B was 4.8. In Comparative Example 1-1, Li doping was not performed, and therefore, cleaning was not performed either. Consequently, Comparative Example 1-1 does not satisfy the above-described ratio. Moreover, compared to Comparative Example 1-1, the initial efficiency and the capacity retention rate were improved in Example 1-1.

Examples 1-2 to 1-5, Comparative Examples 1-2, 1-3

With a silicon compound shown by SiO$x$, the evaluation of the cycle characteristics of the secondary battery and the other evaluations were performed by the same procedures as in Example 1-1 except that the value of $x$ was changed.

TABLE 2

SiOx $D_{50}$ = 5 μm, graphite (natural graphite:artificial graphite = 5:5) $D_{50}$ = 20 μm SiOx ratio: 10 mass %, $Li_2Si_2O_5$, coating amount of carbon: 5 mass %, A/B = 4.8 half value width: 1.85°, crystallite size: 4.6 nm, modification method: oxidation-reduction method, volume resistivity: 0.3 Ωcm

| | $x$ | Initial efficiency % | Capacity retention rate % |
|---|---|---|---|
| Comparative Example 1-2 | 0.3 | 91.2% | 72% |
| Example 1-1 | 1 | 89.5% | 82% |
| Example 1-2 | 0.5 | 90.5% | 81% |
| Example 1-3 | 0.7 | 90.1% | 82% |

TABLE 2-continued

SiOx $D_{50}$ = 5 μm, graphite (natural graphite:artificial
graphite = 5:5) $D_{50}$ = 20 μm SiOx ratio: 10 mass %,
$Li_2Si_2O_5$, coating amount of carbon: 5 mass %, A/B =
4.8 half value width: 1.85°, crystallite size: 4.6 nm,
modification method: oxidation-reduction method,
volume resistivity: 0.3 Ωcm

|  | x | Initial efficiency % | Capacity retention rate % |
|---|---|---|---|
| Example 1-4 | 1.2 | 89.1% | 82% |
| Example 1-5 | 1.6 | 89.1% | 83% |
| Comparative Example 1-3 | 1.8 | — | — |

As shown in Table 2, with a silicon compound shown by SiOx, when the value of x was outside the range of 0.5≤x≤1.6, the battery characteristics were degraded. For example, as shown in Comparative Example 1-2, when there was not enough oxygen (x=0.3), the initial efficiency was improved, but the capacity retention rate was considerably degraded. On the other hand, as shown in Comparative Example 1-3, when the oxygen amount was large (x=1.8), a decrease in conductivity occurred, and substantially, the capacity of the silicon oxide was not exhibited, and therefore, the evaluation was suspended.

Examples 2-1 to 2-3, Comparative Example 2-1

In Examples 2-1 to 2-3, a negative electrode active material, a negative electrode material, and a secondary battery were fabricated and the evaluation of the cycle characteristics of the secondary battery and the other evaluations were performed by the same procedures as in Example 1-1 except that the Li silicate type was changed by changing the Li doping amount. In Comparative Example 2-1, Li doping was not performed, but the other procedures including the cleaning were performed as in Example 1-1, and a negative electrode active material, a negative electrode material, and a secondary battery were fabricated, and the evaluation of the cycle characteristics of the secondary battery and the other evaluations were performed.

TABLE 3

SiOx: x = 1 $D_{50}$ = 5 μm, graphite (natural graphite:artificial
graphite = 5:5) $D_{50}$ = 20 μm SiOx ratio: 10
mass %, coating amount of carbon: 5 mass %, A/B = 4.8
half value width: 1.85°, crystallite size: 4.6 nm, modification
method: oxidation-reduction method, volume resistivity: 0.3 Ωcm

|  | Li compound | Initial efficiency % | Capacity retention rate % |
|---|---|---|---|
| Example 1-1 | $Li_2Si_2O_5$ | 89.5% | 82% |
| Comparative Example 2-1 | None | 78.9% | 79% |
| Example 2-1 | $Li_2Si_2O_5$, $Li_2SiO_3$ | 90.4% | 82% |
| Example 2-2 | $Li_2SiO_3$ | 89.8% | 82% |
| Example 2-3 | $Li_4SiO_4$, $Li_2SiO_3$ | 90.1% | 83% |

As shown in Table 3, since the silicon compound particles contained stable lithium silicate such as $Li_4SiO_4$, $Li_2SiO_3$, and $Li_2Si_2O_5$, initial efficiency and capacity retention rate were improved. On the other hand, when the silicon compound particles did not contain a Li compound as in Comparative Example 2-1, the initial efficiency was considerably reduced.

Examples 3-1 to 3-5, Comparative Example 3-1

Starting with the negative electrode active material of Example 2-1, the A/B ratio was adjusted by the surface modification of the silicon compound particles. As the method of surface modification, when making the A/B ratio small, the cleaning time with alkaline water was made longer. Thus, the dissolved amount Li salt was increased and the O-component fragment was reduced. When making the A/B ratio large, heating was performed under a $CO_2$ atmosphere. Thus, LiOH and $Li_2O$ became $Li_2CO_3$, and the O-component fragment was increased.

TABLE 4

SiOx: x = 1 $D_{50}$ = 5 μm, graphite (natural
graphite:artificial graphite = 5:5) $D_{50}$ = 20 μm SiOx ratio: 10
mass %, coating amount of carbon: 5 mass %, $Li_2SiO_3$, $Li2Si_2O_5$
half value width: 1.85°, crystallite size: 4.6 nm, modification
method: oxidation-reduction method, volume resistivity: 0.3 Ωcm

|  | A/B | Initial efficiency % | Capacity retention rate % |
|---|---|---|---|
| Example 2-1 | 4.8 | 90.4% | 82% |
| Example 3-1 | 2.8 | 90.2% | 84% |
| Example 3-2 | 14.1 | 89.6% | 81% |
| Example 3-3 | 30.5 | 89.1% | 81% |
| Example 3-4 | 0.5 | 90.2% | 84% |
| Example 3-5 | 97.2 | 88.8% | 80% |
| Comparative Example 3-1 | 105.3 | 86.8% | 78% |

As shown in Table 4, when the A/B ratio is large, the binding with the binder is improved, and as a result, the capacity retention rate is improved. On the other hand, when the A/B ratio is too large, side reaction due to the O component trapping the Li is increased, and the initial efficiency is reduced.

Examples 4-1 to 4-5

A negative electrode active material, a negative electrode material, and a secondary battery were fabricated and the evaluation of the cycle characteristics of the secondary battery and the other evaluations were performed by the same procedures as in Example 2-1 except that the crystallinity in the silicon compound was changed. Crystallinity in the silicon compound particles can be controlled by changing the evaporation temperature of the raw material or heating the silicon compound particle. Although Example 4-5 exhibited a half value width of 20° or more, this value was obtained by fitting with analysis software, and substantially, the peak value was not obtained. Therefore, the silicon compound in Example 4-5 can be said to be substantially amorphous.

TABLE 5

SiOx: x = 1 $D_{50}$ = 5 μm, graphite (natural
graphite:artificial graphite = 5:5) D50 = 20 μm SiOx
ratio: 10 mass %, coating amount of carbon: 5 mass %,
$Li_2SiO_3$, $Li_2Si_2O_5$, A/B = 4.8 modification method:
oxidation-reduction method, volume resistivity: 0.3 Ωcm

|  | Si (111)half value width: 2θ | crystallite size: nm | Initial efficiency % | Capacity retention rate % |
|---|---|---|---|---|
| Example 2-1 | 1.85 | 4.6 | 90.4% | 82% |
| Example 4-1 | 0.80 | 10.8 | 92.3% | 78% |

TABLE 5-continued

SiOx: x = 1 $D_{50}$ = 5 μm, graphite (natural graphite:artificial graphite = 5:5) D50 = 20 μm SiOx ratio: 10 mass %, coating amount of carbon: 5 mass %, $Li_2SiO_3$, $Li_2Si_2O_5$, A/B = 4.8 modification method: oxidation-reduction method, volume resistivity: 0.3 Ωcm

|  | Si (111)half value width: 2θ | crystallite size: nm | Initial efficiency % | Capacity retention rate % |
|---|---|---|---|---|
| Example 4-2 | 1.22 | 7.2 | 91.8% | 80% |
| Example 4-3 | 2.26 | 3.8 | 90.4% | 83% |
| Example 4-4 | 10.12 | 1.5 | 90.6% | 84% |
| Example 4-5 | 20.22 | — | 90.6% | 85% |

As can be seen from Table 5, a high initial efficiency and capacity retention rate were obtained particularly from the low crystallinity materials with a half value width of 1.2° or more and a crystallite size attributable to the Si(111) face of 7.5 nm or less.

Examples 5-1 to 5-7

A negative electrode active material, a negative electrode material, and a secondary battery were fabricated and the evaluation of the cycle characteristics of the secondary battery and the other evaluations were performed by the same procedures as in Example 2-1 except that the median diameter of the particle diameter of the silicon compound particle was changed.

TABLE 6

SiOx: x = 1, graphite (natural graphite:artificial graphite = 5:5) $D_{50}$ = 20 μm SiOx ratio: 10 mass %, coating amount of carbon: 5 mass %, $Li_2SiO_3$, $Li_2Si_2O_5$, A/B = 4.8 half value width: 1.85°, crystallite size: 4.6 nm, modification method: oxidation-reduction method, volume resistivity: 0.3 Ωcm

|  | Median diameter μm | Initial efficiency % | Capacity retention rate % |
|---|---|---|---|
| Example 2-1 | 5 | 90.4% | 82% |
| Example 5-1 | 0.5 | 89.1% | 78% |
| Example 5-2 | 1 | 89.3% | 79% |
| Example 5-3 | 3 | 89.9% | 80% |
| Example 5-4 | 8 | 90.4% | 85% |
| Example 5-5 | 10 | 90.6% | 84% |
| Example 5-6 | 15 | 90.6% | 84% |
| Example 5-7 | 20 | 90.1% | 83% |

As can be seen from Table 6, since the median diameter of the silicon-based negative electrode active material particle was 0.5 μm or more and 20 μm or less, favorable results were obtained for the initial efficiency and the capacity retention rate. Moreover, when the median diameter of the silicon-based negative electrode active material particles was 3 μm or more, the initial efficiency and the retention rate were further improved. This is probably because the surface area per mass of the silicon compound particle was not so large and a side reaction was suppressed. On the other hand, when the median diameter of the silicon-based negative electrode active material particles is 15 μm or less, particles are hard to break upon charging, so that SEI (solid electrolyte interface) due to the new surface is hardly formed upon charging and discharging. Thus, the reversible Li loss can be suppressed. Moreover, when the median diameter of the silicon compound particles is 15 μm or less, the expansion amount of the silicon compound particles upon charging does not become too large, making it possible to prevent physical and electrical destruction of the negative electrode active material layer due to expansion.

Example 6-1

A negative electrode active material, a negative electrode material, and a secondary battery were fabricated and the evaluation of the cycle characteristics of the secondary battery and the other evaluation were performed by the same procedures as in Example 1-1 except that the modification method was changed to thermal doping method. In producing the negative electrode active material, firstly, the procedures were performed up to the carbon coating in the same way as in Example 1. Subsequently, under an argon atmosphere, the silicon compound particles coated with the carbon coating were mixed with LiH powder whose mass was equivalent to 4 mass % of the silicon compound particles, and agitated with a shaker. Thereafter, in an atmosphere-controlled furnace, the agitated powder was heated at 740° C. for the modification. The heated powder was sufficiently cooled, and then cleaned with lithium carbonate aqueous solution, and an adjustment was made so that A/B became 4.8.

TABLE 7

SiOx: x = 1 $D_{50}$ = 5 μm, graphite (natural graphite:artificial graphite = 5:5) $D_{50}$ = 20 μm SiOx ratio: 10 mass %, coating amount of carbon: 5 mass %, A/B = 4.8 half value width: 1.85°, crystallite size: 4.6 nm, volume resistivity: 0.3 Ωcm

|  | Modification method | Initial efficiency % | Capacity retention rate % | Silicate type |
|---|---|---|---|---|
| Example 1-1 | Oxidation-reduction method | 89.5% | 82% | $Li_2Si_2O_5$ |
| Example 6-1 | Thermal doping | 88.6% | 80% | $Li_2Si_2O_5$, $Li_2SiO_3$ |

As can also be seen from Table 7, a favorable initial efficiency and capacity retention rate were obtained not only by the oxidation-reduction method, but also when the thermal doping was used.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A negative electrode active material for a non-aqueous electrolyte secondary battery, containing a negative electrode active material particle, wherein
the negative electrode active material particle comprises a silicon compound particle containing a silicon compound, $SiO_x$, where $0.5 \leq x \leq 1.6$,
the silicon compound particle at least partially contains at least one selected from the group consisting of $Li_4SiO_4$, $Li_2SiO_3$, and $Li_2Si_2O_5$,
at least a part of the silicon compound particle is coated with a carbon material,
a coating amount of the carbon material is 0.5 mass % or more and 15 mass % or less relative to a total of the silicon compound particle and the carbon material, and an O-component fragment and a CH-component fragment are detected from the negative electrode active material particle in a measurement by Time-of-Flight Secondary Ion Mass Spectrometry (TOF-SIMS), and a ratio of a peak intensity A of the O-component fragment to a peak intensity B of the CH-component fragment is 0.5≤A/B≤100.

2. The negative electrode active material for a non-aqueous electrolyte secondary battery according to claim 1, wherein the negative electrode active material particle has a volume resistivity of 0.01 Ω·cm or more and less than 100 Ω·cm which is measured by a four-point probe method in accordance with JIS K 7194 under a load of 38.2 MPa.

3. The negative electrode active material for a non-aqueous electrolyte secondary battery according to claim 1, wherein the silicon compound particle has a diffraction peak attributable to a Si(111) crystal face obtained from an X-ray diffraction, a half value width (2θ) of the diffraction peak is 1.2° or more, and a crystallite size corresponding to the crystal face is 7.5 nm or less.

4. The negative electrode active material for a non-aqueous electrolyte secondary battery according to claim 2, wherein the silicon compound particle has a diffraction peak attributable to a Si(111) crystal face obtained from an X-ray diffraction, a half value width (2θ) of the diffraction peak is 1.2° or more, and a crystallite size corresponding to the crystal face is 7.5 nm or less.

5. The negative electrode active material for a non-aqueous electrolyte secondary battery according to claim 1, wherein the silicon compound particle has a median diameter of 0.5 μm or more and 20 μm or less.

6. The negative electrode active material for a non-aqueous electrolyte secondary battery according to claim 2, wherein the silicon compound particle has a median diameter of 0.5 μm or more and 20 μm or less.

7. The negative electrode active material for a non-aqueous electrolyte secondary battery according to claim 3, wherein the silicon compound particle has a median diameter of 0.5 μm or more and 20 μm or less.

8. The negative electrode active material for a non-aqueous electrolyte secondary battery according to claim 4, wherein the silicon compound particle has a median diameter of 0.5 μm or more and 20 μm or less.

9. A non-aqueous electrolyte secondary battery comprising the negative electrode active material for a non-aqueous electrolyte secondary battery according to claim 1.

10. A method for producing a negative electrode material for a non-aqueous electrolyte secondary battery containing a negative electrode active material particle comprising a silicon compound particle, the method comprising the steps of:
fabricating the silicon compound particle containing a silicon compound, $SiO_x$, where 0.5≤x≤1.6;
coating at least a part of the silicon compound particle with a carbon material to obtain a coated silicon compound particle, a coating amount of the carbon material being 0.5 mass % or more and 15 mass % or less relative to a total of the silicon compound particle and the carbon material;
inserting Li into the silicon compound particle to modify the silicon compound particle in a manner such that the silicon compound particle at least partially contains at least one selected from the group consisting of $Li_4SiO_4$, $Li_2SiO_3$, and $Li_2Si_2O_5$; and
cleaning the coated silicon compound particle after modification; and
selecting the negative electrode active material particle, wherein an O-component fragment and a CH-component fragment are detected from the negative electrode active material particle after cleaning, in a measurement by TOF-SIMS, and a ratio of a peak intensity A of the O-component fragment to a peak intensity B of the CH-component fragment is 0.5≤A/B≤100, and
wherein the negative electrode material for the non-aqueous electrolyte secondary battery is produced using the negative electrode active material particle which has been selected.

11. A method for producing a negative electrode material for a non-aqueous electrolyte secondary battery containing a negative electrode active material particle comprising a silicon compound particle, the method comprising:
fabricating the silicon compound particle containing a silicon compound, $SiO_x$, where 0.5≤x≤1.6;
coating at least a part of the silicon compound particle with a carbon material to obtain a coated silicon compound particle, a coating amount of the carbon material being 0.5 mass % or more and 15 mass % or less relative to a total of the silicon compound particle and the carbon material;
inserting Li into the silicon compound particle to modify the silicon compound particle in a manner such that the silicon compound particle at least partially contains at least one selected from the group consisting of $Li_4SiO_4$, $Li_2SiO_3$, and $Li_2Si_2O_5$;
cleaning the coated silicon compound particle after modification; and
fabricating the negative electrode active material particle by performing on the coated silicon compound particle after cleaning, a surface modification to adjust an intensity of an O-component fragment detected in a measurement by TOF-SIMS such that the O-component fragment and a CH-component fragment are detected in a measurement by TOF-SIMS, and a ratio of a peak intensity A of the O-component fragment to a peak intensity B of the CH-component fragment is 0.5≤A/B≤100;
wherein the negative electrode material for the non-aqueous electrolyte secondary battery is produced using the negative electrode active material particle which has been fabricated.

12. The method according to claim 11, wherein
the surface modification to adjust the intensity of the O-component fragment detected in the measurement by TOF-SIMS includes:
decreasing the ratio of the peak intensity A of the O-component fragment to the peak intensity B of the CH-component fragment by increasing a cleaning time of the coated silicon compound particle after modification with alcohol, alkaline water, weak acid, or pure water; or
increasing the ratio of the peak intensity A of the O-component fragment to the peak intensity B of the CH-component fragment by heating the coated silicon compound particle after cleaning under a $CO_2$ atmosphere.

* * * * *